US008811996B2

United States Patent
Jung et al.

(10) Patent No.: US 8,811,996 B2
(45) Date of Patent: Aug. 19, 2014

(54) METHOD FOR PERFORMING A HANDOVER THROUGH ZONE-SWITCHING IN A BROADBAND WIRELESS ACCESS SYSTEM

(75) Inventors: In Uk Jung, Anyang-si (KR); Yong Ho Kim, Anyang-si (KR); Ki Seon Ryu, Anyang-si (KR)

(73) Assignee: LG Electronics Inc., Seoul (KR)

( * ) Notice: Subject to any disclaimer, the term of this patent is extended or adjusted under 35 U.S.C. 154(b) by 106 days.

(21) Appl. No.: 13/518,374

(22) PCT Filed: Dec. 21, 2010

(86) PCT No.: PCT/KR2010/009144
§ 371 (c)(1),
(2), (4) Date: Jan. 2, 2013

(87) PCT Pub. No.: WO2011/078545
PCT Pub. Date: Jun. 30, 2011

(65) Prior Publication Data
US 2013/0109388 A1    May 2, 2013

Related U.S. Application Data

(60) Provisional application No. 61/288,345, filed on Dec. 21, 2009.

(51) Int. Cl.
*H04W 36/00* (2009.01)

(52) U.S. Cl.
CPC ...... *H04W 36/0005* (2013.01); *H04W 36/0066* (2013.01)
USPC ...................................................... 455/436

(58) Field of Classification Search
CPC ..... H04W 36/30; H04W 36/32; H04W 36/18; H04W 28/04; H04W 80/04
USPC ......... 455/436, 437, 438, 439, 440, 441, 442, 455/443, 444
See application file for complete search history.

(56) References Cited

U.S. PATENT DOCUMENTS

| 2006/0030309 | A1* | 2/2006 | Lee et al. ................... 455/422.1 |
| 2008/0311913 | A1* | 12/2008 | Thiebaut et al. .............. 455/436 |
| 2010/0008328 | A1* | 1/2010 | Maheshwari et al. ........ 370/331 |
| 2010/0069073 | A1* | 3/2010 | Chen et al. .................... 455/437 |

FOREIGN PATENT DOCUMENTS

WO    2006/107701    10/2006

OTHER PUBLICATIONS

Kyounghwan Lee et al., "Missing Scenario of Handover Process Supporting Legacy System", IEEE 802.16 Broadband Wireless Access Working Group, IEEE C802.16m-09/0063r3, Jan. 2009.
XiangyingYang et al., "Zone switching operations in 16e/16m mixed mode operations", IEEE 802.16 Broadband Wireless Access Working Group, IEEE C802.16m-09/0532, Mar. 2009.

* cited by examiner

*Primary Examiner* — Sharad Rampuria
*Assistant Examiner* — Sayed T Zewari
(74) *Attorney, Agent, or Firm* — Lee, Hong, Degerman, Kang & Waimey

(57) ABSTRACT

The present invention relates to a broadband wireless access system, and more particularly, to a method for performing a handover through zone-switching. According to one embodiment of the present invention, the method in which an advanced mobile station (AMS) performs a handover from a legacy serving base station through zone-switching in a broadband wireless access system comprises: a step of receiving, from a legacy zone (L-zone) of a target advanced base station (ABS), a message of a response to a request for ranging (RNG-RSP), containing information on a zone-switching time: and a step of starting switching to an advanced mobile station support zone (M-zone) at the point of time indicated by the information on a zone-switching time.

10 Claims, 6 Drawing Sheets

METHOD FOR PERFORMING A HANDOVER THROUGH ZONE-SWITCHING IN A BROADBAND WIRELESS ACCESS SYSTEM

CROSS-REFERENCE TO RELATED APPLICATIONS

This application is the National Stage filing under 35 U.S.C. 371 of International Application No. PCT/KR2010/009144, filed on Dec. 21, 2010, which claims the benefit of U.S. Provisional Application Ser. No. 61/288,345, filed on Dec. 21, 2009, the contents of which are all incorporated by reference herein in their entirety.

TECHNICAL FIELD

The present invention relates to a broadband wireless access system, and more particularly, to a method for performing a handover through zone-switching.

BACKGROUND ART

Generally, handover (HO) means that a mobile station moves away from a radio interface of one base station into a radio interface of another base station. In the following description, a handover procedure in a general IEEE 802.16 system is explained.

In IEEE 802.16 network, in order to inform a mobile station (hereinafter abbreviated MS) of information (e.g., topology) on a basic network configuration, a serving base station (hereinafter abbreviated SBS) is able to broadcast neighbor base station information via a neighbor advertisement (MOB_NBR-ADV) message.

In the MOB_NBR-ADV message, contained are such system information on a serving base station and neighbor base stations as a preamble index, a frequency and a handover (HO) optimization availability, DCD/UCD (downlink channel descriptor/uplink channel descriptor) information and the like.

The DCD/UCD information contains informations that should be known to a mobile station in order for the mobile station to perform information communications in DL/UL (downlink/uplink). For instance, the informations may include handover (HO) trigger information, MAC (medium access control) version information of a base station, MIH (media independent handover) capability information of a base station and the like.

In a general MOB_NBR-ADV message, informations on neighbor base stations of IEEE 802.16e type are contained. Hence, informations of neighbor base stations of types except UEEE 802.16e may be broadcasted to mobile stations via SII-ADV (service identity information advertisement) message. Accordingly, the mobile station may be able to acquire informations of a heterogeneous network base station by making a request for a serving base station to send the SII-ADV message.

In the following description, a procedure for a mobile station, which has acquired information on a neighbor base station by the above-described method, to perform a handover on IEEE 802.16 network is explained in detail with reference to FIG. 1.

FIG. 1 shows one example of a handover procedure executable in a general IEEE 802.16 system.

Referring to FIG. 1, first of all, a mobile station (MS) is connected with a serving base station (SBS) and is then able to perform a data exchange [S101].

The serving base station periodically broadcasts information on a neighbor base station neighboring to the serving base station to the mobile station via MOB_NBR-ADV message [S102].

In the course of communicating with the serving base station, the mobile station is able to start scanning candidate base stations (candidate HO BSs) using a handover trigger condition. If such a handover condition as a prescribed hysterisis margin is exceeded, the mobile station is able to make a request for a handover procedure execution to the serving base station by sending a handover request (MOB_MSHO-REQ) message [S103].

The serving base station is able to notify the handover request made by the mobile station to the candidate base stations (candidate HO BSs) contained in the MOB_MSHO-REQ message [S104].

Each of the candidate base stations (candidate HO BSs) takes a preemptive step for the mobile station having made the request for the handover and is then able to deliver informations related to the handover to the serving base station via HO-RSP message [S105].

The serving base station is able to deliver the handover related informations, which are obtained from the candidate base stations (candidate HO BSs) via the HO-RSP messages, to the mobile station via handover response (MOB_BSHO-RSP) message. In this case, in the MOB_BSHO-RSP message, such information for performing the handover as an action time for the handover, a handover identifier (HO-ID), a dedicated handover (HO) CDMA ranging code and the like can be included [S106].

Based on the information included in the MOB_BSHO-RSP message received from the serving base station, the mobile station is able to determine a target base station among the candidate base stations. Subsequently, the mobile station is able to attempt a ranging by transmitting CDMA code to the determined target base station [S107].

Having received the CDMA code, the target base station is able to transmit a success or failure of the ranging and physical correction values to the mobile station via a ranging response (RNG-RSP) message [S108].

Subsequently, the mobile station is able to send a ranging request (RNG-REQ) message for authentication to the target base station [S109].

Having received the ranging request message, the target base station is able to provide the mobile station with such system information usable by the corresponding base station as CID (connection identifier) and the like via a ranging response message [S110].

If the target base station successfully completes the authentication of the mobile station and sends all update information, it may be able to notify a success or failure of the handover to the serving base station of the mobile station via a handover complete message (HO-CMPT) [S111].

Thereafter, the mobile station is able to perform information exchange with the handover performed base station [S112].

The above-described handover process is assumed as performed between a mobile station and a base station in accordance with IEEE 902.16e specification (e.g.; WirelessMAN-OFDMA R1 Reference System). For clarity of the following description, a system, to which a general technology including IEEE 802.16e specification is applied, is named 'legacy system'. And, a mobile station, to which a legacy technology is applied, is named 'VMS (yardstick MS)' or a 'legacy mobile station'. Moreover, a base station, to which a legacy technology is applied, is named 'legacy base station', 'R1 BS' or 'YBS (yardstick BS)'.

A mobile station, to which a technology (e.g., IEEE 802.16m specification: WirelessMAN-OFDMA Advanced System) further advanced than a general technology is applied, is named 'AMS (advanced MS)' or 'advanced mobile station'. And, a base station, to which the advanced technology is applied, is named 'ABS (advanced BS)' or 'advanced base station'.

Assume a case that AMS is receiving a service by being connected with YBS and that AMS (WirelessMAN-OFDMA R1 Reference System/VVirelessMAN-OFDMA Advanced Co-existing system) supporting both AMS and YMS exists by neighboring to the YBS.

Assume that the YBS ha a legacy zone (LZone) having a physical channel frame structure applied to a legacy system. Assume that the ABS has an advanced mobile station support zone (MZone: 16M zone) having a physical channel frame structure applied to an AMS supportive only advanced system (WirelessMAC-OFDMA advanced system only). Assume that ABS supporting both AMS and YMS (WirelessMAC-OFDMA Reference System/WirelessMAC-OFDMA Advanced Co-existing System: legacy supportive) has a legacy zone and an advanced mobile station supportive zone and that each zone is divided by time unit, e.g., by frame or subframe unit (TDD: time division duplex) in uplink and downlink each.

Assume that AMS is able to receive services from ABS and YBS both. In particular, assume that the AMS is able to receive a service via one of an advanced mobile station supportive zone and a legacy zone and that the AMS is able to perform both a handover performing process defined in a legacy system and a handover performing process defined in an advanced system.

Generally, in order to perform a handover into ABS supporting both AMS and YMS from a serving YBS, AMS firstly enters a legacy zone of the ABS and then keeps receiving a service or may perform a zone switch to an advanced mobile station supportive zone. Moreover, the AMS may be able to perform a handover in a manner of switching a zone into an advanced mobile station supportive zone directly without entering the legacy zone of the ABS.

In particular, regarding the zone switch, as LZone and MZone divided by time division duplex (TDD) exist within a single carrier, AMS used to operate in the LZone is set to operate in a resource region of the MZone. In more particular, IEEE 802.16m MAC operation is performed by being switched from IEEE 802.16e MAC operation. This may include an operation that the AMS moves to the LZone from the MZone.

For this zone switch, when AMS performs a handover into ABS supporting both YMS and AMS from YBS, in order for the AMS to receive a service according to an advanced system specification from the ABS, the AMS needs to inform the ABS that it is the AMS itself. Moreover, if the ABS recognizes the handover of the AMS, it should transmit system information of the ABS for the enhanced system, i.e., system information on an advanced mobile station supportive zone to the AMS. Besides, in order to receive a service according to the advanced system specification of the ABS, the AMS should attempt a ranging to the advanced mobile station supportive zone. To this end, the AMS needs to make a request for a bandwidth.

Therefore, in order for a mobile station following an advanced system specification to perform a handover, the demand for an efficient handover method with backward compatibility is rising.

DISCLOSURE OF THE INVENTION

Technical Tasks

Accordingly, the present invention is directed to substantially obviate one or more problems due to limitations and disadvantages of the related art. First of all, an object of the present invention is to provide an apparatus for performing a handover through a more efficient zone switch and method thereof.

Another object of the present invention is to provide an apparatus for performing a handover and method thereof, by which a radio resource can be efficiently used in a manner of defining a time for an advanced mobile station to perform a zone switch to an advanced mobile station supportive zone of a target base station in a handover process through a zone switch.

Technical tasks obtainable from the present invention are non-limited the above mentioned technical tasks. And, other unmentioned technical tasks can be clearly understood from the following description by those having ordinary skill in the technical field to which the present invention pertains.

Technical Solutions

To achieve these and other advantages and in accordance with the purpose of the present invention, as embodied and broadly described, a method of performing a handover, which is performed through a zone switch by an advanced mobile station (AMS) from a legacy serving base station in a broadband wireless access system, according to one embodiment of the present invention may include the steps of receiving a ranging response (RNG-RSP) message including a zone switch time information from a legacy zone (LZone) of a target advanced base station (ABS) and starting the zone switch to an advanced mobile station supportive zone (MZone) at a time indicated by the zone switch time information.

Preferably, the zone switch time information may be included in the ranging response message in form of a zone switch information (Zone Switch TLV) required for performing the zone switch.

Preferably, the zone switch starting step may include the step of receiving system information of the advanced mobile station supportive zone using the zone switch information.

Preferably, the zone switch starting step may include the step of requesting a bandwidth for sending a ranging request message (AAI_RNG-REQ) to the advanced mobile station supportive zone using the zone switch information.

Preferably, the zone switch information may include at least one of preamble index information (MZone A-Preamble index) used in the advanced mobile station supportive zone, time offset information indicating a divided boundary between the legacy zone and the advanced mobile station supportive zone, Zone Switch Mode information indicating whether the advanced mobile station maintains a connection with the legacy zone in the course of the zone switch, Temporary STID (station identifier) information for identifying the advanced mobile station temporarily in the advanced mobile station supportive zone and ranging initiation deadline information indicating a valid time of a temporary station identifier.

To further achieve these and other advantages and in accordance with the purpose of the present invention, a method of supporting a handover, which is supported by a target advanced base station through a zone switch of an advanced mobile station (AMS) in a broadband wireless access system, according to one embodiment of the present invention may include the steps of sending a ranging response message (RNG-RSP) including zone switch time information to the advanced mobile station via a legacy zone (LZone) and broadcasting system information of an advanced mobile station supportive zone via the advanced mobile station supportive zone (MZone) at a time indicated by the zone switch time information.

Preferably, the zone switch time information may be included in the ranging response message in form of a zone switch information (Zone Switch TLV) required for performing the zone switch.

Preferably, the zone switch information may include at least one of preamble index information (MZone A-Preamble index) used in the advanced mobile station supportive zone, time offset information indicating a divided boundary between the legacy zone and the advanced mobile station supportive zone, Zone Switch Mode information indicating whether the advanced mobile station maintains a connection with the legacy zone in the course of the zone switch, Temporary STID (station identifier) information for identifying the advanced mobile station temporarily in the advanced mobile station supportive zone and ranging initiation deadline information indicating a valid time of a temporary station identifier.

More preferably, if the zone switch mode information indicates that the advanced mobile station does not maintain the connection with the legacy zone in the course of the zone switch, the base station does not perform a resource allocation via the legacy zone on the advanced mobile station since the time indicated by the zone switch time information.

Preferably, the ranging response message sending step may be unsolicitedly performed after the advanced mobile station has finished a network reentry into the legacy zone.

To further achieve these and other advantages and in accordance with the purpose of the present invention, an advanced mobile station (AMS) device, which performs a handover through a zone switch from a legacy serving base station in a broadband wireless access system, according to another embodiment of the present invention may include a processor and a radio communication (RF) module configured to transceive a radio signal with an external environment under the control of the processor, wherein the processor receives a ranging response (RNG-RSP) message including a zone switch time information from a legacy zone (LZone) of a target advanced base station (ABS) and wherein the processor controls the zone switch to an advanced mobile station supportive zone (MZone) to be started at a time indicated by the zone switch time information.

Preferably, the zone switch time information may be included in the ranging response message in form of a zone switch information (Zone Switch TLV) required for performing the zone switch.

Preferably, the processor may control the zone switch to be started in a manner of receiving system information of the advanced mobile station supportive zone using the zone switch information.

Preferably, the processor may control the zone switch to be started in a manner of requesting a bandwidth for sending a ranging request message (AAI_RNG-REQ) to the advanced mobile station supportive zone using the zone switch information.

Preferably, the zone switch information may include at least one of preamble index information (MZone A-Preamble index) used in the advanced mobile station supportive zone, time offset information indicating a divided boundary between the legacy zone and the advanced mobile station supportive zone, Zone Switch Mode information indicating whether the advanced mobile station maintains a connection with the legacy zone in the course of the zone switch, Temporary STID (station identifier) information for identifying the advanced mobile station temporarily in the advanced mobile station supportive zone and ranging initiation deadline information indicating a valid time of a temporary station identifier.

Advantageous Effects

Accordingly, the present invention may provide the following effects and/or features.

First of all, using embodiments of the present invention, a handover procedure through a zone switch can be efficiently performed.

Secondly, using embodiments of the present invention, a radio resource can be efficiently used in a manner of defining a time for a mobile station to perform a zone switch to an advanced mobile station supportive zone of a target base station.

Effects obtainable from the present invention are non-limited the above mentioned effect. And, other unmentioned effects can be clearly understood from the following description by those having ordinary skill in the technical field to which the present invention pertains.

MODE FOR INVENTION

Figure 1:
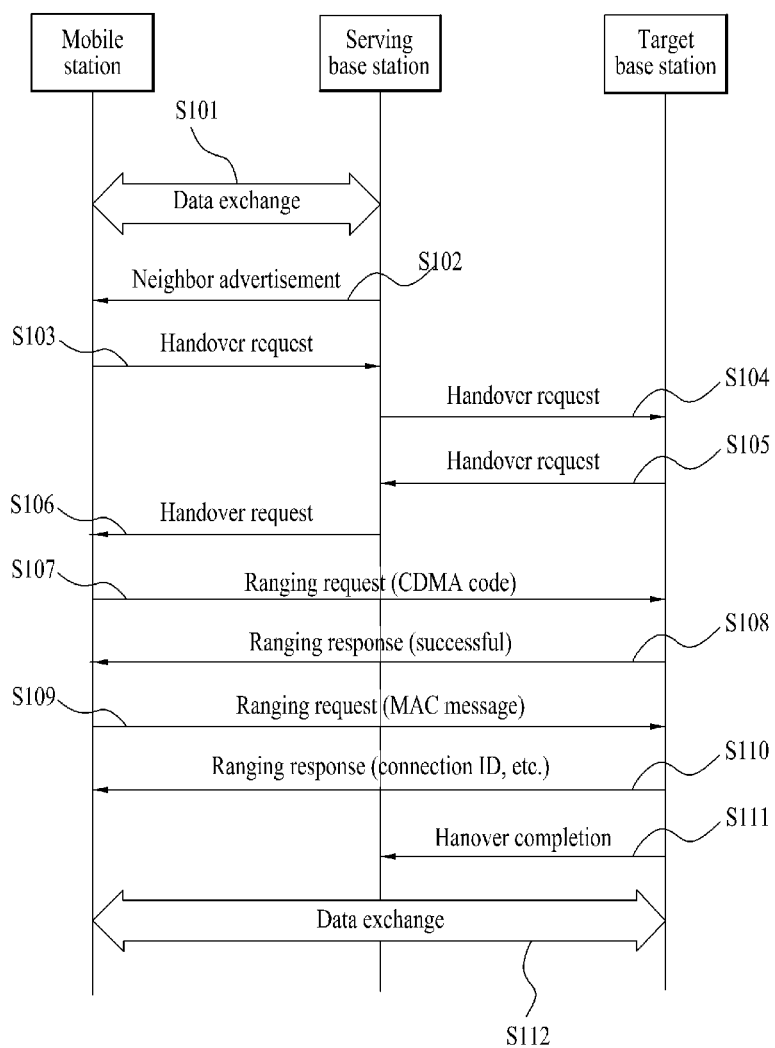
FIG. 1 shows one example of a handover procedure executable in a general IEEE 802.16 system.

In order to carry out the above-mentioned technical tasks, the present invention discloses methods of efficiently performing a handover through a zone switch in a manner of defining a time for an advanced mobile station (AMS) to perform the zone switch.

The following embodiments correspond to combinations of elements and features of the present invention in prescribed forms. And, it is able to consider that the respective elements or features are selective unless they are explicitly mentioned. Each of the elements or features can be implemented in a form failing to be combined with other elements or features. Moreover, it is able to implement an embodiment of the present invention by combining elements and/or features together in part. A sequence of operations explained for each embodiment of the present invention can be modified. Some configurations or features of one embodiment can be included in another embodiment or can be substituted for corresponding configurations or features of another embodiment.

In this disclosure, embodiments of the present invention are described centering on the data transmission/reception relations between a base station and a terminal. In this case, the base station is meaningful as a terminal node of a network which directly performs communication with the terminal. In this disclosure, a specific operation explained as performed by a base station can be performed by an upper node of the base station in some cases.

In particular, in a network constructed with a plurality of network nodes including a base station, it is apparent that various operations performed for communication with a terminal can be performed by a base station or other networks except the base station. In this case, 'base station' can be replaced by such a terminology as a fixed station, a Node B, an eNode B (eNB), an access point and the like. And, 'terminal' can be replaced by such a terminology as a user equipment (UE), a mobile station (MS), a mobile subscriber station (MSS), a subscriber station (SS) and the like.

Embodiments of the present invention can be implemented using various means. For instance, embodiments of the present invention can be implemented using hardware, firmware, software and/or any combinations thereof.

In case of the implementation by hardware, a method according to each embodiment of the present invention can be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, a method according to each embodiment of the present invention can be implemented by modules, procedures, and/or functions for performing the above-explained functions or operations. Software code is stored in a memory unit and is then drivable by a processor. The memory unit is provided within or outside the processor to exchange data with the processor through the various means known to the public.

Embodiments of the present invention are supportable by standard documents disclosed in at least one of wireless access systems including IEEE 802 system, 3GPP system, 3GPP LTE system and 3GPP2 system. In particular, the steps or parts, which are not explained to clearly reveal the technical idea of the present invention, in the embodiments of the present invention can be supported by the above documents. Moreover, all terminologies disclosed in this document can be supported by the above standard documents. Specifically, embodiments of the present invention can be supported by at least one of P802.16-2005, P802.16e-2009, P802.16Rev2 and P802.16m documents which are the standards of IEEE 802.16 system.

In the following description, specific terminologies are provided to help the understanding of the present invention. And, the use of the specific terminology can be modified into another form within the scope of the technical idea of the present invention.

In the following description, handover processes through a zone switch according to the present invention are explained.

Figure 2:
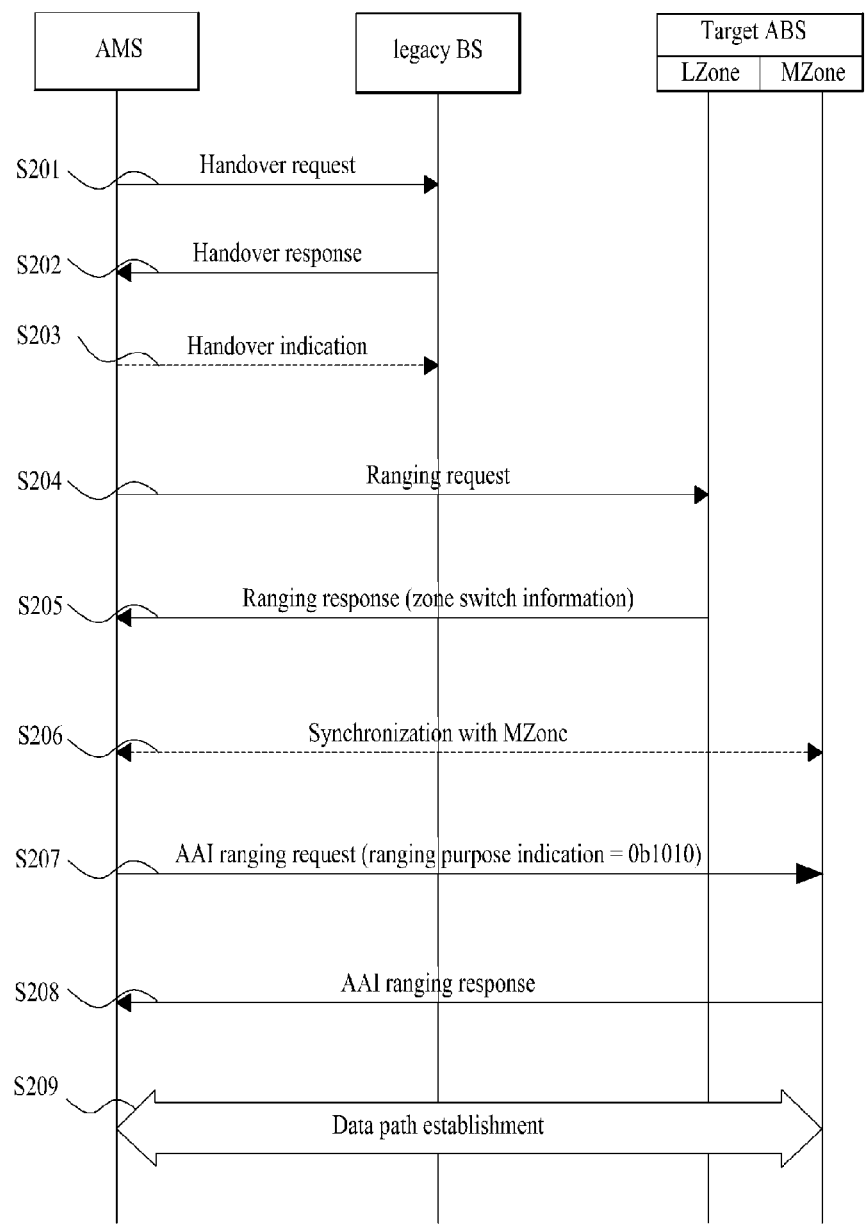
FIG. 2 shows one example of a handover process using a zone switch.

FIG. 2 shows one example of a handover process using a zone switch.

Referring to FIG. 2, in the course of communicating with a legacy serving base station, a mobile station (AMS) is able to start scanning candidate base stations (candidate HO BSs) using a handover (HO) trigger condition. If such a handover condition as a prescribed hysterisis margin value is exceeded, the mobile station is able to make a request for a handover procedure execution to the serving base station by sending a handover request (MOB_MSHO-REQ) message [S201].

The serving base station is able to deliver the handover related informations, which are obtained from the candidate base stations (candidate HO BSs), to the mobile station via handover response (MOB_BSHO-RSP) message. In this case, in the MOB_BSHO-RSP message, such information for performing the handover as an action time for the handover, a handover identifier (HO-ID), a dedicated handover (HO) CDMA ranging code and the like can be included [S202].

Based on the information included in the MOB_BSHO-RSP message received from the serving base station, the mobile terminal may be able to determine a legacy supportive ABS as a target base station among the candidate base stations. Hence, the mobile station may be able to send a handover indication message to the serving legacy base station [S203].

Subsequently, the mobile station may send a ranging request (RNG-REQ) message to LZone of the target base station [S204].

In doing so, information on a medium access control (MAC) version of the mobile station may be contained in the ranging request message and its value may be set to a value corresponding to the AMS.

Through the MAC version information contained in the ranging request message or information obtained from a previous serving base station, the base station is aware that the mobile station having sent the ranging message is the advanced mobile station (AMS) and may enable a zone switch to MZone to be performed.

To this end, the target base station may send the mobile station a ranging response (RNG-RSP) message containing information (zone switch TLV: hereinafter abbreviated ZS TLV) requested to the mobile station for the zone switch.

In this case, the informations shown in Table 1 may be contained in the ZS TLV.

Table 1 shows one example of ZS TLV information contained in RNG-RSP message according to the present invention.

TABLE 1

| Name | Type (1 byte) | Length | Value |
|---|---|---|---|
| MZone A-Preamble index | 41 | 2 | |
| Time offset | 42 | 1 | Time offset between LZone and MZone |
| Zone Switch Mode | 44 | 1 | 0x01: AMS maintains its data communication with the ABS in LZone while performing network reentry in MZone; 0x00: AMS breaks data communication in LZone before performing network reentry in MZone. |
| Temporary STID | 46 | 1 | Temporary STID for being used in MZone |
| Ranging initiation deadline | 47 | 1 | Valid time for Temporary STID. Shall be included if Temporary STID is included. |

Referring to Table 1, in ZS TLV, information on a preamble index used in MZone (MZone A-Preamble index), Time offset information indicating a divided boundary (or rate) between LZone and MZone in TDD frame structure, Zone Switch Mode information indicating whether a mobile station maintains a connection with LZone in a zone switch process, Temporary STID (station identifier) information for identifying a mobile station temporarily in MZone, Ranging initiation deadline information indicating a valid time of a temporary station identifier and the like may be included. Besides, NONCE ABS value (not shown in Table 1) for security key creation may be further included.

Subsequently, the mobile station performs synchronization with MZone of the target ABS using the information included in the ZS TLV [S206] and may then make a request (BR request for AAI_RNG-REQ) for an uplink resource for sending a ranging request (AAI_RNG-REQ) message in order to perform a zone switch [not shown in the drawing].

If the requested uplink resource is allocated from the MZone, the mobile station sends the ranging request (AAI-RNG-REQ) message to the MZone [S207]. In dong so, a value of a ranging purpose indication field of the ranging request message may be set to a value (e.g., Ob1010) that indicates the zone switch to the MZone from the LZone.

In response to the ranging request message sent by the mobile station, the target ABS may send a ranging response (AAI_RNG-RSP) message to the mobile station [S208].

Thereafter, the mobile station finishes the zone switch to the MZone and may then perform a normal communication with the target ABS [S209].

In the method described with reference to FIG. 2, the mobile station performs the zone switch to the MZone before finishing the network reentry into the LZone of the target base station. Alternatively, after the mobile station has finished the network reentry into the LZone, it may be able to perform the zone switch to the MZone. This is described with reference to FIG. 3 as follows.

Figure 3:
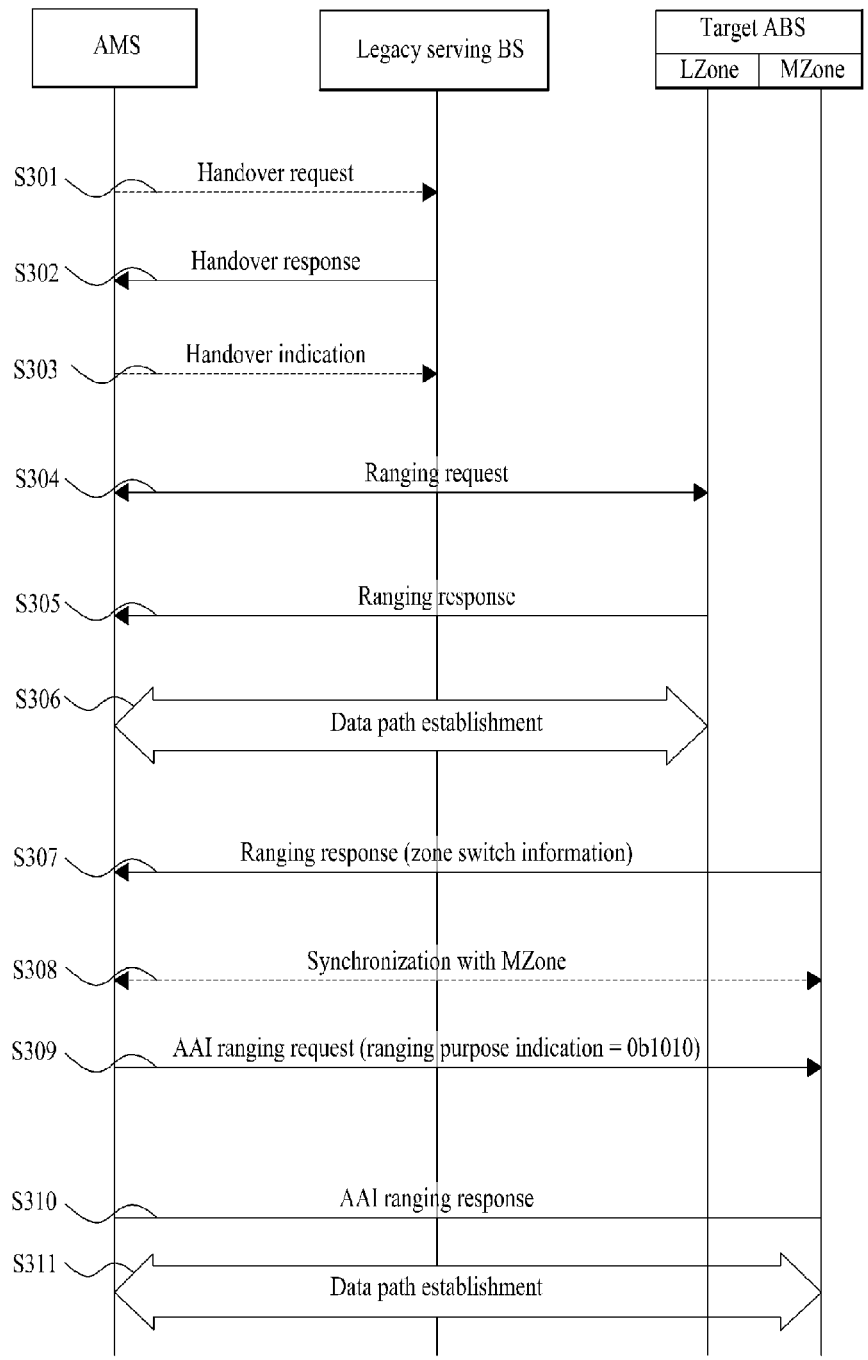
FIG. 3 shows another example of a handover process using a zone switch.

FIG. 3 shows another example of a handover process using a zone switch.

Since steps S301 to S304 shown in FIG. 3 are similar to the former steps S201 to S204 shown in FIG. 2, their details shall be omitted for clarity of the following description with reference to FIG. 3.

Referring to FIG. 3, a target base station receives RNG-REQ message from a mobile station, recognizes that the mobile station having sent the RNG-REQ message is an advanced mobile station (AMS) through MAC version information included in the ranging request message or information obtained from a previous serving legacy base station, and may enable a zone switch to MZone to be performed. Yet, the target base station may withhold the zone switch of the mobile station due to such a reason as a load balancing between LZone and MZone and the like.

Hence, the target base station may send a ranging response (RNG-RSP) message having ZS TLV not included therein to the mobile station [S305]. The mobile station finishes a network reentry into the LZone of the target base station and may be then able to perform a normal communication [S306].

Thereafter, if the target base station determines to instruct the corresponding mobile station to perform the zone switch to the MZone, it may be able to send a ranging response (RNG-RSP) message including the ZS TLV to the mobile station unsolicitedly [S307].

Subsequently, the mobile station performs synchronization with the MZone of the target ABS using the information included in the ZS TLV [S308] and may then make a request (BR request for AAI_RNG-REQ) for an uplink resource for sending a ranging request (AAI_RNG-REQ) message in order to perform a zone switch [not shown in the drawing].

If the requested uplink resource is allocated from the MZone, the mobile station sends the ranging request (AAI-RNG-REQ) message to the MZone [S309]. In dong so, a value of a ranging purpose indication field of the ranging request message may be set to a value (e.g., Ob1010) that indicates the zone switch to the MZone from the LZone.

In response to the ranging request message sent by the mobile station, the target ABS may send a ranging response (AAI_RNG-RSP) message to the mobile station [S310].

Thereafter, the mobile station finishes the zone switch to the MZone and may be then able to perform a normal communication with the target ABS [S311].

Definition of Time Related to Zone Switch

If a mobile station performs a zone switch, it may be similar to a case that the mobile station performs a handover. This is because a data path between a mobile station and a base station is changed into MZone from LZone. If the data path is changed, it may mean that a data exchange continues in a manner of terminating a current data path at a specific time and then setting a new data path in a zone-switched target zone.

Yet, when a mobile station performs a zone switch to MZone from LZone, it may be more efficient in aspect of a base station than a case that a corresponding procedure is performed based on a time, timer or deadline that becomes a reference. This is because the definition for an action or operation of the mobile station is not clear in the course of a zone switch without the aforementioned time or timer.

Moreover, when a mobile station performs a zone switch to MZone from LZone, it may be necessary to clearly define when a network reentry is finished in the MZone or when a data exchange is finished in the LZone. Otherwise, since a base station has no reference to determine how long a data exchange with the mobile station continues, a data loss may occur. Specifically, in case that a zone switch mode is set to 0 (i.e., Zone Switch Mode=0), the base station breaks data communication with the LZone before performing a zone switch to the MZone. Hence, if the base station is not aware of the time for the mobile station to attempt the zone switch to the MZone (i.e., if the time is not defined), the mobile station may keep attempting resource allocation or data transmission despite breaking the data communication. Hence, a data loss may occur or a radio resource may be wasted.

In order to change a data path and to set a data path establishment, the following two references may be mainly set up.

First of all, a reference may be necessary to determine when a mobile station performs a zone switch. In particular, it may become a reference for determining when a data path establishment or a network reentry will begin. In this case, the reference information may be configured in a manner of indicating a specific time.

Secondly, it may be able to set up a reference for determining how long a mobile station keeps performing a zone switch. In particular, it may become a reference for determining when a data path establishment will begin (or be allowed). In this case, the reference information may be configured as a timer or a deadline.

In this specification, the aforementioned reference time of the present invention shall be named 'ZS time' for clarity. If the ZS time information is contained in ZS TLV included in RNG-RSP message, 'ZS time' may be named 'action time'.

In the following description, one embodiment of the present invention is explained with reference to a definition reference of ZS time.

Case of Defining ZS Time as Zone Switch Start Time

In case that AMS defines ZS time as a time of starting a zone switch, one example of a handover performing method by a zone switch is described with reference to FIG. 4 as follows.

Figure 4:
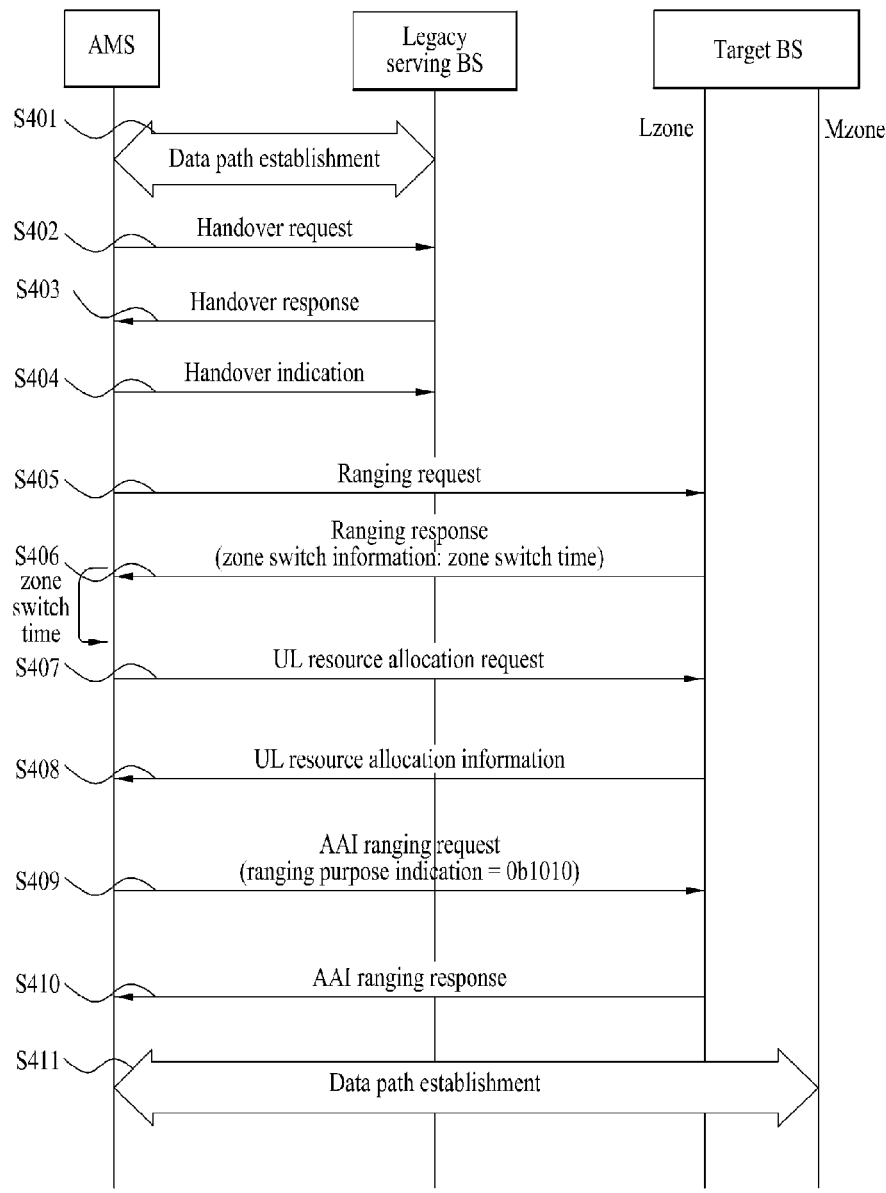
FIG. 4 shows one example of a handover process using a zone switch according to one embodiment of the present invention.

FIG. 4 shows one example of a handover process using a zone switch according to one embodiment of the present invention.

Referring to FIG. 4, a mobile station (AMS) performs an initial network reentry or a network reentry on a serving base station, establishes a data path, and then performs a normal communication [S401]. In the course of performing the normal communication, the mobile station may be able to start scanning candidate base stations (candidate HO BSs) using a handover trigger condition.

If such a handover condition as a prescribed hysterisis margin value is exceeded, the mobile station is able to make a request for a handover procedure execution to the serving base station by sending a handover request (MOB_MSHO-REQ) message [S402].

If the base station instructs the mobile station to initiate handover [BS-initiated HO], the step S402 may be omitted.

The serving base station is able to deliver the handover related informations, which are obtained from the candidate base stations, to the mobile station via handover response (MOB_BSHO-RSP) message. In this case, in the MOB_B-SHO-RSP message, such information for performing the handover as an action time for the handover, a handover identifier (HO-ID), a dedicated handover (HO) CDMA ranging code and the like can be included [S403].

Based on the information included in the MOB_BSHO-RSP message received from the serving base station, the mobile terminal may be able to determine a legacy supportive (mixed mode) ABS as a target base station among the candidate base stations. Hence, the mobile station may be able to send a handover indication (HO_IND) message to the serving legacy base station [S404].

Subsequently, the mobile station may send a ranging request (RNG-REQ) message to LZone of the target base station [S405].

In doing so, information on a medium access control (MAC) version of the mobile station may be contained in the ranging request message and its value may be set to a value corresponding to the AMS.

Through the MAC version information contained in the ranging request message or information obtained from a previous serving base station, the base station is aware that the mobile station having sent the ranging message is the advanced mobile station (AMS) and may enable a zone switch to MZone to be performed.

To this end, the target base station may send the mobile station a ranging response (RNG-RSP) message containing information (ZS TLV) requested to the mobile station for the zone switch. In this case, ZS time information may be contained in the ZS TLV shown in Table 2.

Table 2 shows one example of ZS TLV configuration included in a ranging response message according to one embodiment of the present invention.

TABLE 2

| Name | Type (1 byte) | Length | Value |
|---|---|---|---|
| MZone A-Preamble index | 41 | 2 | |
| Time offset | 42 | 1 | Time offset between LZone and MZone |
| Action Time | 43 | 1 | Action time of zone switch from LZone to MZone. AMS performs zone switch at Action Time. If Zone Switch Mode = 0, ABS stops all resource allocation for the AMS at LZone. |
| Zone Switch Mode | 44 | 1 | 0x01: AMS maintains its data communication with the ABS in LZone while performing network reentry in MZone; 0x00: AMS breaks data communication in LZone before performing network reentry in MZone. |
| Temporary STID | 46 | 1 | Temporary STID for being used in MZone |
| Ranging initiation deadline | 47 | 1 | Valid time for Temporary STID. Shall be included if Temporary STID is included. |

Referring to Table 2, compared to table 1, Action Time field indicating ZS time information is added to indicate a time for a mobile station to perform a zone switch to MZone. In this case, if a zone switch mode is set to 0, it is indicated that a target base station stops resource allocation to AMS via LZone from ZS time. Hence, it is able to prevent a radio resource from being wasted.

In order to start a zone switch at the time indicated by the ZS time information, the mobile station may be able to request an uplink resource for sending a ranging request (AAI_RNG-REQ) message to the MZone of the target base station [S407]. In this case, if Zone Switch Mode=0, the resource allocation via the LZone is stopped from this time according to the definition shown in Table 2.

Hence, the target base station allocates the uplink resource requested by the mobile station [S408]. The mobile station then sends the ranging request message to the MZone via the allocated uplink resource [S409].

In dong so, a value of a ranging purpose indication field of the ranging request message may be set to a value (e.g., Ob1010) that indicates the zone switch to the MZone from the LZone.

In response to the ranging request message sent by the mobile station, the target ABS may send a ranging response (AAI_RNG-RSP) message to the mobile station [S410].

Thereafter, the mobile station finishes the zone switch to the MZone and may then perform a normal communication with the target ABS [S411].

In the procedure described with reference to FIG. 4, when the uplink resource for sending the AAI-RNG-REQ message is requested [BR for AAI_RNG-REQ], it is explained that the AMS starts the zone switch. Yet, for the uplink resource request, the mobile station may need to know system information of the MZone. Hence, the zone switch start time of the mobile station may be regarded as the time of receiving the system information of the MZone, i.e., the time of receiving a superframe header of the MZone. In this case, ZS time (Action Time) information may indicate the time of transmitting SFH (particularly, S-SFH IE for performing a bandwidth request/network reentry) of the MZone. If the ZS time information indicates the time of transmitting the SFH of the MZone, the mobile station may not need to perform unnecessary decoding or wait for SFH transmission to obtain the system information of the MZone. Therefore, it is efficient.

Meanwhile, the definition of the ZS time according to the present embodiment may be applicable to a case that a zone switch to MZone is performed after completion of a network reentry into LZone. This is described with reference to FIG. 5 as follows.

Figure 5:
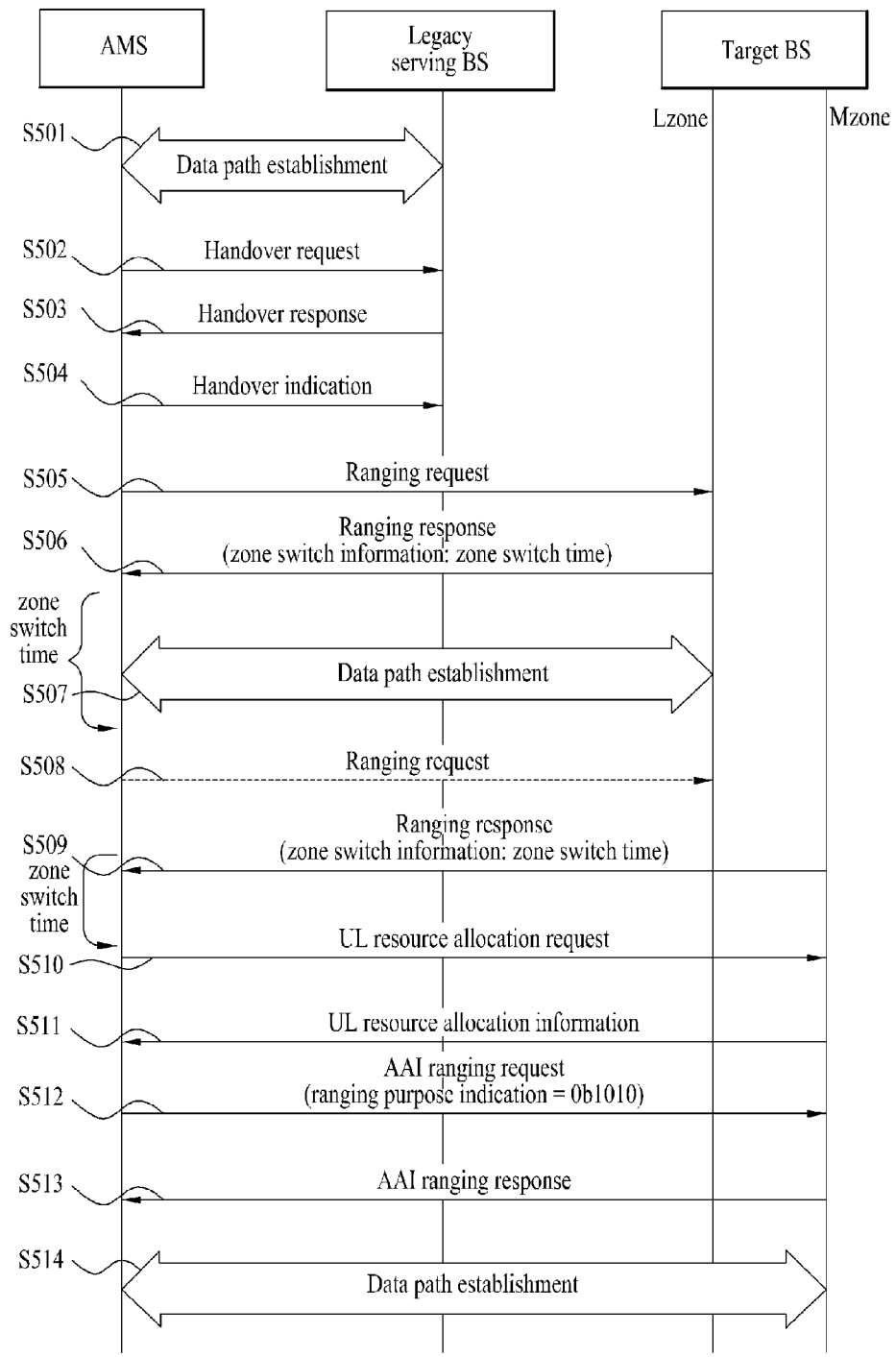
FIG. 5 shows another example of a handover process using a zone switch according to one embodiment of the present invention.

FIG. 5 shows another example of a handover process using a zone switch according to one embodiment of the present invention.

Since steps S501 to S506 shown in FIG. 5 are similar to the former steps S401 to S406 shown in FIG. 4, respectively, their details shall be omitted for clarity of the following description with reference to FIG. 5.

Referring to FIG. 5, although the mobile station completes a network reentry into LZone before a time indicated by ZS time information arrives [S507], as the mobile station does not receive SFH of MZone successfully, the mobile station may not perform a zone switch to the MZone at the time indicated by the ZS time information. If so, the mobile station should regularly perform the zone switch again.

To this end, in order for the mobile station to make a request for ZS TLV to the LZone again, the mobile station sends a ranging request message [S508]. Alternatively, the base station may send a ranging response message containing ZS TLV to the mobile station unsolicitedly.

Therefore, the mobile station may attempt the zone switch again at the time indicated by the ZS time information contained in the ZS TLV.

Since steps S509 to S514 shown in FIG. 5 are similar to the former steps S407 to S411 shown in FIG. 4, their details shall be omitted for clarity of the following description.

In the procedure described with reference to FIG. 5, ZS TLV may not be included in the ranging response message sent to the mobile station in the step S506 according to the determination made by the base station. If so, the mobile station performs a general network reentry into the LZone and may follow the aforementioned steps from the step S507. Moreover, in case that a zone switch start of the mobile station is defined as SFH reception of the MZone in FIG. 5, ZS time (Action Time) information may indicate the time of transmitting SFH (particularly, S-SFH IE for performing a bandwidth request/network reentry) of the MZone.

Case of Defining ZS Time as Deadline of Zone Switch Performance

A final decision for a mobile station to perform a zone switch to MZone may be generally made by a base station. Yet, the time for the mobile station to actually perform the zone switch to the MZone is the time after the mobile station has received all system information on the MZone. System information may become superframe header (SFH) information of the MZone. In the superframe header information, informations on subpackets 1 (S-SFH IE SP1) to subpacket 3 (S-SFH IE SP3) are included and correspond to setup informations for the mobile station to perform a normal data communication with a target ABS via the MZone. Yet, a mobile station operating in LZone in a related art system may not send a base station an indication indicating whether a reception of the SFH of the MZone is successfully completed.

Therefore, the base station determines a deadline for allowing the mobile station to perform a zone switch rather than an accurate time for the mobile station to perform a zone switch and may then enable the mobile station to perform the zone switch after receiving all SFH of MZone within the corresponding deadline. In particular, a target ABS informs the mobile station of the deadline via ZS TLV. The mobile station may then start the zone switch within the corresponding time.

In this case, the description of Action Time information shown in Table 2 may be modified as follows.

Action Time (ZS time): The time during which the AMS shall perform zone switch to MZone.

In case that ZS time is regarded as a deadline, it may be necessary to define whether the corresponding deadline is satisfied on the condition that a prescribed procedure is completed. First of all, according to the aforementioned definition, a mobile station may be regarded as finishing SFH reception of MZone until the time indicated by ZS time information included in ZS TLV. Secondly, a process for requesting an uplink resource allocation for sending AAI_RNG-REQ message to MZone is performed until the time indicated by ZS time information.

As mentioned in the foregoing description, even if the ZS time is regarded as the deadline for allowing the zone switch performance, the handover procedure through the zone switch may be applicable to FIG. 4 and FIG. 5 as it is. Yet, it may be different that the zone switch should be initiated until the corresponding time rather than the time indicated by the ZS time.

Configurations of Mobile and Base Stations

In the following description, a mobile station and a base station (FBS or MBS) for implementing the above-mentioned embodiments of the present invention according to another embodiment of the present invention are explained.

First of all, a mobile station may work as a transmitter in uplink or may work as a receiver in downlink. A base station may work as a receiver in uplink or may work as a transmitter in downlink. In particular, each of the mobile station and the base station may include a transmitter and a receiver for transmission of information and/or data.

Each of the transmitter and the receiver may include a processor, a module, a part and/pr a means for performing embodiments of the present invention. In particular, each of the transmitter and the receiver can include a module (means) for encrypting a message, a module for interpreting the encrypted message, an antenna for transceiving the message and the like. One example of the transmitting and receiving stages is described with reference to FIG. 6 as follows.

Figure 6:
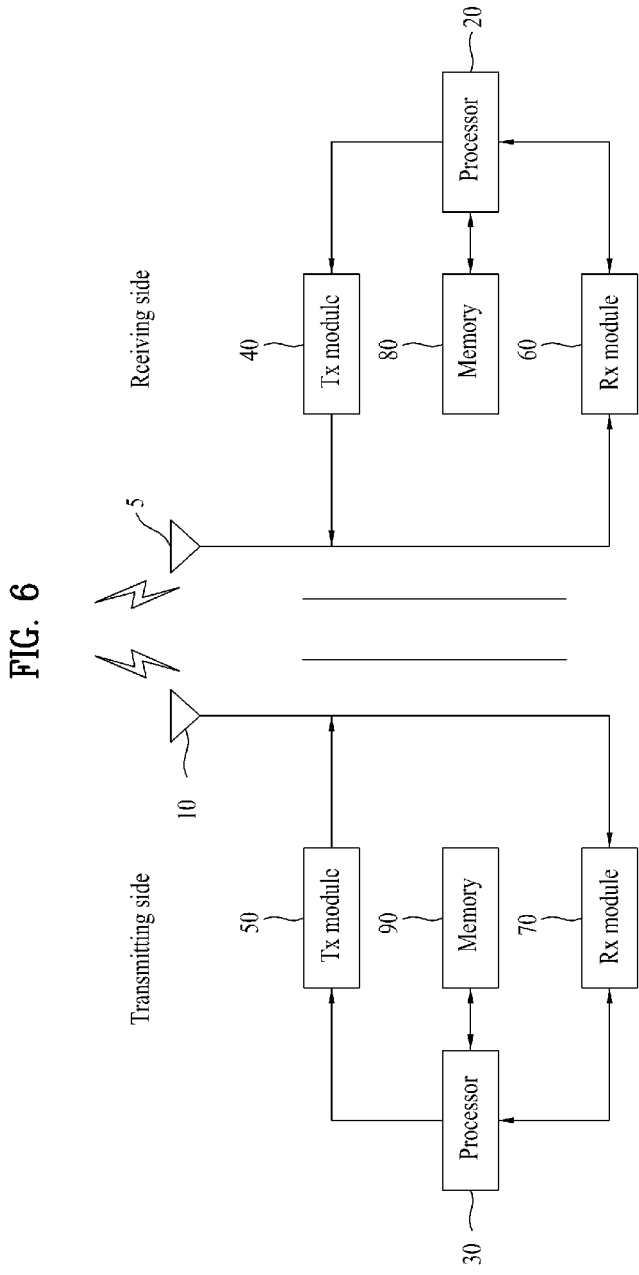
FIG. 6 is a block diagram for one example of configurations of transmitting and receiving stages according to another embodiment of the present invention.

FIG. 6 is a block diagram for one example of configurations of transmitting and receiving stages according to another embodiment of the present invention.

Referring to FIG. 6, a left part of the drawing represents a configuration of a transmitting stage, while a right part of the drawing represents a configuration of a receiving stage. Each of the transmitting and receiving stages may include an antenna 5/10, a processor 20/30, a transmitting module (Tx module) 40/50, a receiving module (Rx module) 60/70 and a memory 80/90. In this case, the respective components may perform corresponding functions. The respective components are described in detail as follows.

First of all, the antenna 5/10 externally transmits a signal generated from the transmitting module 40/50. And, the antenna 5/10 receives a radio signal from outside and then delivers the received radio signal to the receiving module 60/70. In case that a multiple-antenna (MIMO) function is supported, at least two antennas may be provided.

The antenna, the transmitting module and the receiving module may be integrated into a radio communication (RF) module.

The processor 20/30 generally controls overall operations of a mobile terminal. In particular, the processor 20/30 may be able to perform a control function for performing the above-described embodiments of the present invention, a MAC (medium access control) frame variable control function according to service characteristics and propagation environment, a handover function, an authentication function, an encryption function and the like. In particular, the processor 20/20 may perform overall controls to perform the handover through the zone switch shown in FIGS. 2 to 5.

In more particular, when a handover into a legacy supportive ABS, the processor of the mobile terminal (AMS) may control the receiving module to receive a ranging response message including ZS LTV from LZone of a target ABS. In this case, ZS time (Action Time) information indicating a time related to a performance of a zone switch is included in the ZS TLV. The process may control the zone switch to be initiated until the corresponding time according to the definition of the ZS time or may control the zone switch to start at the corresponding time.

Besides, the processor of the mobile station may be able to perform overall control operations of the operating steps disclosed in the aforementioned embodiments.

The transmitting module 40/50 performs prescribed coding and modulation on a signal and/or data, which is scheduled by the processor 20/30 and will be then transmitted externally, and is then able to deliver the coded and modulated signal and/or data to the antenna 10.

The receiving module 60/70 reconstructs the radio signal received externally via the antenna 5/10 into original data in a manner of performing decoding and demodulation on the received radio signal and is then able to deliver the reconstructed original data to the processor 20/30.

The memory 80/90 may store programs for the processing and control of the processor 20/30 and is able to perform a function of temporarily storing input/output data. And, the memory 80/90 may include at least one of storage media including a flash memory, a hard disk, a multimedia card micro type memory, a memory card type memory (e.g., SD memory, XD memory, etc.), a RAM (random access memory), an SRAM (static random access memory), a ROM (read-only memory), an EEPROM (electrically erasable programmable read-only memory), a PROM (programmable read-only memory), a magnetic memory, a magnetic disk, an optical disk and the like.

Meanwhile, the base station may include means, modules, parts and/or the like for performing a controller function for performing the above-described embodiments of the present invention, an OFDMA (orthogonal frequency division multiple access) packet scheduling, TDD (time division duplex) packet scheduling and channel multiplexing function, a MAC (medium access control) frame variable control function according to a service characteristic and electric wave environment, a fast traffic real-time control function, a handover function, an authentication and encryption function, a packet modulation/demodulation function for data transmission, a fast packet channel coding function, a real-time modem control function, and the like.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents. And, it is apparently understandable that an embodiment is configured by combining claims failing to have relation of explicit citation in the appended claims together or can be included as new claims by amendment after filing an application.

INDUSTRIAL APPLICABILITY

Accordingly, the handover performing procedure through the more efficient zone switch in the broadband wireless access system and the terminal configuration for the same are described with reference to the example applied to UEEE 802.16m system and may be applicable to various mobile communication systems including 3GPP/3GPP2 and the like as well as IEEE 802.xx systems.

What is claimed is:

1. A method of performing a handover through a zone switch by an advanced mobile station (AMS) from a legacy serving base station to a target advanced base station (ABS) in a wireless communication system, the method comprising:
    receiving, by the AMS from a legacy zone (LZone) of the target ABS, a ranging response message used for a ranging procedure, the ranging response message including information regarding a zone switch time; and
    performing, by the AMS, the zone switch to an advanced mobile station supportive zone (MZone) based on the information regarding the zone switch time,
    wherein the information regarding the zone switch time is included in the ranging response message in form of zone switch information (Zone Switch TLV), and
    performing, by the AMS, a network reentry in the MZone with the target ABS based on a SuperFrame Header (SFH) of the MZone received from the LZone before performing the zone switch,
    wherein the SFH of the MZone is used to communicate within the MZone with the target ABS after performing the zone switch, and
    wherein the SFH of the MZone includes at least one of a secondary superframe header SubPacket1 (SP1), a secondary superframe header SubPacket2 (SP2) or a secondary superframe header SubPacket3 (SP3) regarding the MZone.

2. The method of claim 1, the performing the zone switch comprising:
    requesting a bandwidth for sending a ranging request message (AAI_RNG-REQ) to the MZone using the information regarding the zone switch.

3. The method of claim 1, wherein the information regarding the zone switch information comprises at least one selected from the group consisting of:
    preamble index information (MZone A-Preamble index) used in the MZone,
    time offset information indicating a divided boundary between the LZone and the MZone,
    Zone Switch Mode information indicating whether or not the AMS maintains a connection with the LZone while performing the zone switch,
    Temporary STID (station identifier) information for temporarily identifying the AMS in the MZone, and
    ranging initiation deadline information indicating a valid time of a temporary station identifier.

4. A method of supporting a zone switch based handover procedure of an advanced mobile station (AMS) by a target advanced base station (ABS) in a broadband wireless access system, the method comprising:
    transmitting, by the target ABS to the AMS via a legacy zone (LZone), a ranging response message used for a ranging procedure, the ranging response message including information regarding a zone switch time;
    transmitting, by the target ABS via the LZone, a superframe header (SFH) of an advanced mobile station supportive zone (MZone) before the zone switch of the AMS is performed;
    wherein the information regarding the zone switch time is included in the ranging response message in form of a zone switch information (Zone Switch TLV); and performing, by the target ABS, a network reentry in the MZone with the AMS after the zone switch of the AMS is performed based on the information regarding the zone switch time, wherein the SFH of the MZone is used to communicate within the MZone with the AMS after the zone switch is performed, and wherein the SFH of the MZone includes at least one of a secondary superframe header SubPacket1 (SP1), a secondary superframe header SubPacket2 (SP2) or a secondary superframe header SubPacket3 (SP3) regarding the MZone.

5. The method of claim 4, wherein the information regarding the zone switch comprises at least one selected from the group consisting of:

preamble index information (MZone A-Preamble index) used in the MZone, time offset information indicating a divided boundary between the LZone and the MZone, Zone Switch Mode information indicating whether or not the AMS maintains a connection with the LZone while performing the zone switch, Temporary STID (station identifier) information for temporarily identifying the AMS in the MZone, and ranging initiation deadline information indicating a valid time of a temporary station identifier.

6. The method of claim 5, further comprising:

if the Zone Switch Mode information indicates that the AMS does not maintain the connection with the LZone while performing the zone switch, not performing a resource allocation for the AMS via the LZone based on the information regarding the zone switch time.

7. The method of claim 4, the transmitting the ranging response message comprises:

unsolicitedly transmitting the ranging response message after the AMS has finished a network reentry into the LZone.

8. An advanced mobile station (AMS), which performs a handover through a zone switch from a legacy serving base station to a target advanced base station (ABS) in a wireless communication system, comprising:

a processor; and a radio communication (RF) module configured to transceive a radio signal with an external environment under the control of the processor, wherein the processor is configured to:

receive, from a legacy zone (LZone) of the target ABS, a ranging response message used for a ranging procedure, the ranging response message including information regarding a zone switch time, perform the zone switch to an advanced mobile station supportive zone (MZone) based on the information regarding the zone switch time, wherein the information regarding the zone switch time is included in the ranging response message in form of a zone switch information (Zone Switch TLV), and perform a network reentry in the MZone with the target ABS based on a SuperFrame Header (SFH) of the MZone received from the LZone before performing the zone switch, wherein the SFH of the MZone is used to communicate within the MZone with the target ABS after performing the zone switch, and wherein the SFH of the MZone includes at least one of a secondary superframe header SubPacket1 (SP1), a secondary superframe header SubPacket2 (SP2) or a secondary superframe header SubPacket3 (SP3) regarding the MZone.

9. The advanced mobile station device of claim 8, wherein the processor is configured to request a bandwidth for sending a ranging request message (AAI_RNG-REQ) to the MZone using the information regarding the zone switch.

10. The advanced mobile station device of claim 8, wherein the zone switch information comprises at least one selected from the group consisting of:

preamble index information (MZone A-Preamble index) used in the MZone, time offset information indicating a divided boundary between the LZone and the advanced mobile station supportive zone, Zone Switch Mode information indicating whether or not the AMS maintains a connection with the LZone while performing the zone switch, Temporary STID (station identifier) information for temporarily identifying the AMS in the MZone, and ranging initiation deadline information indicating a valid time of a temporary station identifier.

* * * * *